United States Patent [19]
Johnson

[11] Patent Number: 5,093,649
[45] Date of Patent: Mar. 3, 1992

[54] BESSEL BEAM RADAR SYSTEM USING SEQUENTIAL SPATIAL MODULATION

[75] Inventor: Walter J. Johnson, Renton, Wash.

[73] Assignee: The Boeing Company, Seattle, Wash.

[21] Appl. No.: 573,998

[22] Filed: Aug. 28, 1990

[51] Int. Cl.$^5$ ............................................. G01S 3/04
[52] U.S. Cl. .................................. 342/157; 342/147; 342/442
[58] Field of Search ............. 342/127, 147, 25, 188, 342/157, 148, 194, 361, 442, 159

[56] References Cited

U.S. PATENT DOCUMENTS

| | | | |
|---|---|---|---|
| 1,874,982 | 8/1932 | Hansell . | |
| 2,452,349 | 10/1948 | Becker . | |
| 2,514,617 | 7/1950 | Albersheim . | |
| 3,130,402 | 4/1964 | Kuck . | |
| 3,133,281 | 5/1964 | Young et al. . | |
| 3,323,128 | 5/1967 | Vogel | 342/147 X |
| 3,364,484 | 1/1968 | Best . | |
| 3,430,239 | 2/1969 | Buell et al. . | |
| 3,611,376 | 10/1971 | Gutleber | 342/157 X |
| 3,713,144 | 1/1973 | Letten et al. | 342/159 |
| 3,849,779 | 11/1974 | Boyd | 342/127 X |
| 3,890,618 | 6/1975 | Speiser | 342/442 X |
| 4,148,028 | 4/1979 | Fujiki . | |
| 4,191,957 | 3/1980 | Walker et al. . | |
| 4,241,347 | 12/1980 | Albanese et al. . | |
| 4,243,988 | 1/1981 | Kang et al. . | |
| 4,639,733 | 1/1987 | King et al. | 342/442 X |
| 4,723,124 | 2/1988 | Boles | 342/25 |

FOREIGN PATENT DOCUMENTS

| | | | |
|---|---|---|---|
| 3620734C1 | 12/1987 | Fed. Rep. of Germany . | |
| 842536 | 7/1960 | United Kingdom | 40/7 |

OTHER PUBLICATIONS

Brown, William M., "Synthetic Aperture Radar," IEEE Transactions on Aerospace and Electronic Systems, vol. AES-3, No. 2, Mar. 1967, pp. 217-229.

Brown, William M. and Fredricks, Ronald J., "Range-Doppler Imaging with Motion Through Resolution Cells," IEEE Transactions on Aerospace and Electronic Systems, vol. AES-5, No. 1, Jan. 1969, pp. 98-102.

Brown, William M. and Porcello, Leonard J., "An Introduction to Synthetic-Aperture Radar," IEEE Spectrum, Sep. 1969, pp. 52-62.

Primary Examiner—Thomas H. Tarcza
Assistant Examiner—Tod R. Swann
Attorney, Agent, or Firm—Christensen, O'Connor, Johnson & Kindness

[57] ABSTRACT

A spatially modulated Bessel beam radar system for enhancing the resolution with which a range and an azimuth of a plurality of closely spaced targets is determined. In a Bessel beam radar system, a Bessel beam is generated by sequential spatial modulation of the radar signal while maintaining a constant spatial polarization, and the return signal from one or more targets is processed to determine its Bessel function content. To spatially modulate the radar beam, the point at which the radar signal is transmitted is moved around a circular orbit. In a first embodiment of the spatially modulated Bessel beam radar system (80), a radar dome (86) mounted on the distal end of a mast (84) is pivoted around an orbit (90). The radar signal is transmitted in a predefined direction, along a Poynting vector that is generally aligned with the plane of the orbit. In a second embodiment (110), a plurality of parabolic antennas (116) are arranged in a spaced-apart circular array around a common center. The radar signal is sequentially spatially modulated as it is transmitted from each of the parabolic antennas in sequence around the circular array, and the Poynting vector of the spatially modulated Bessel beam radar signal is generally transverse to a plane in which the parabolic antennas are disposed. The signal reflected back from plural targets comprises a complex phase history. To determine a range and azimuth for each target, a controller/processor (180), processes this signal to develop closed form Bessel functions from which target azimuth and range are determined. Alternatively, target azimuth is determined from a convolution of the complex phase history using a dot product detector (202).

27 Claims, 12 Drawing Sheets

STATIONARY
TARGET

| | TARGET 1: | TARGET 2: |
|---|---|---|
| AMPLITUDE | .5 | .5 |
| ANGLE | 0 | 90 |
| RADIUS | .25 | .25 |

STATIONARY TARGET
ROTATION 180°

TARGET 2:
AMPLITUDE .5
ANGLE 90
RADIUS .25

STATIONARY TARGET
ROTATION 180°

TARGET 1:
AMPLITUDE .5
ANGLE 0
RADIUS .25

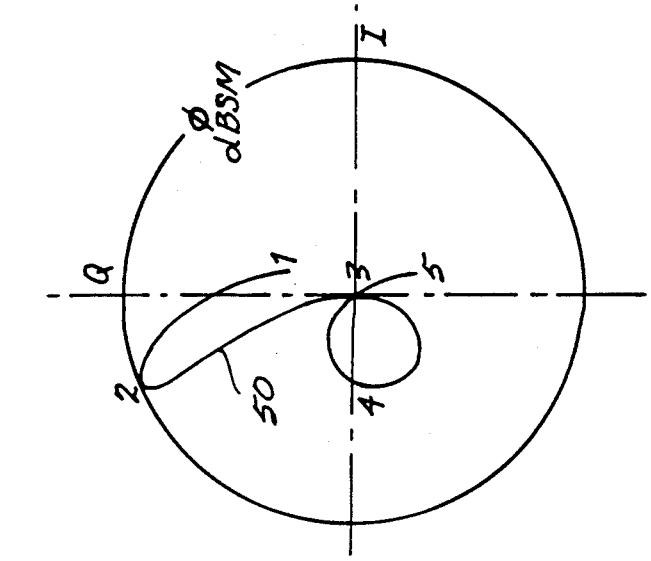
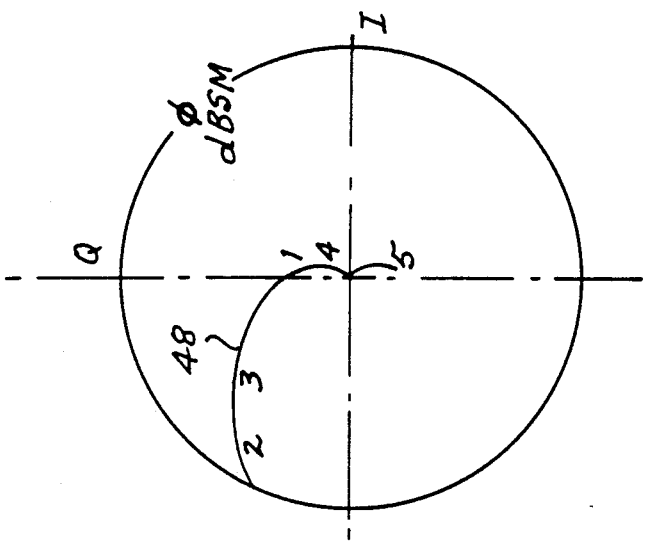
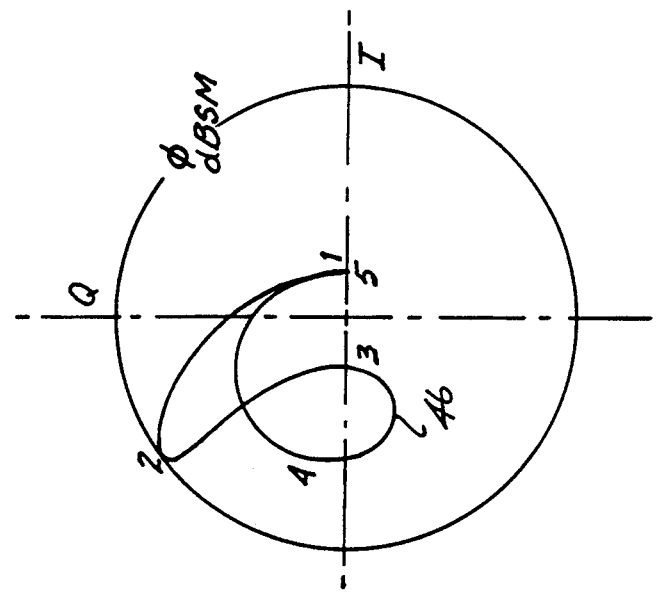

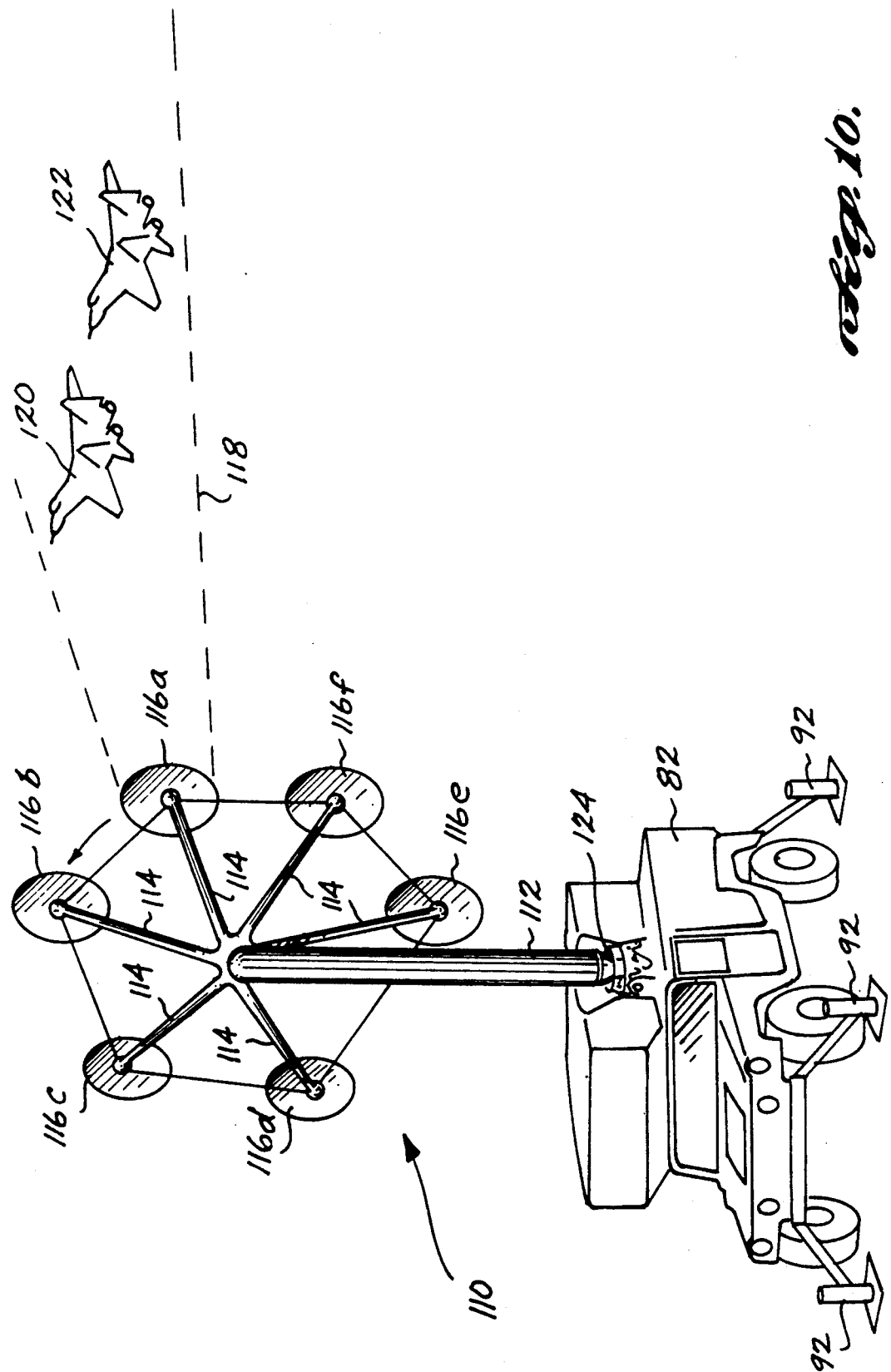

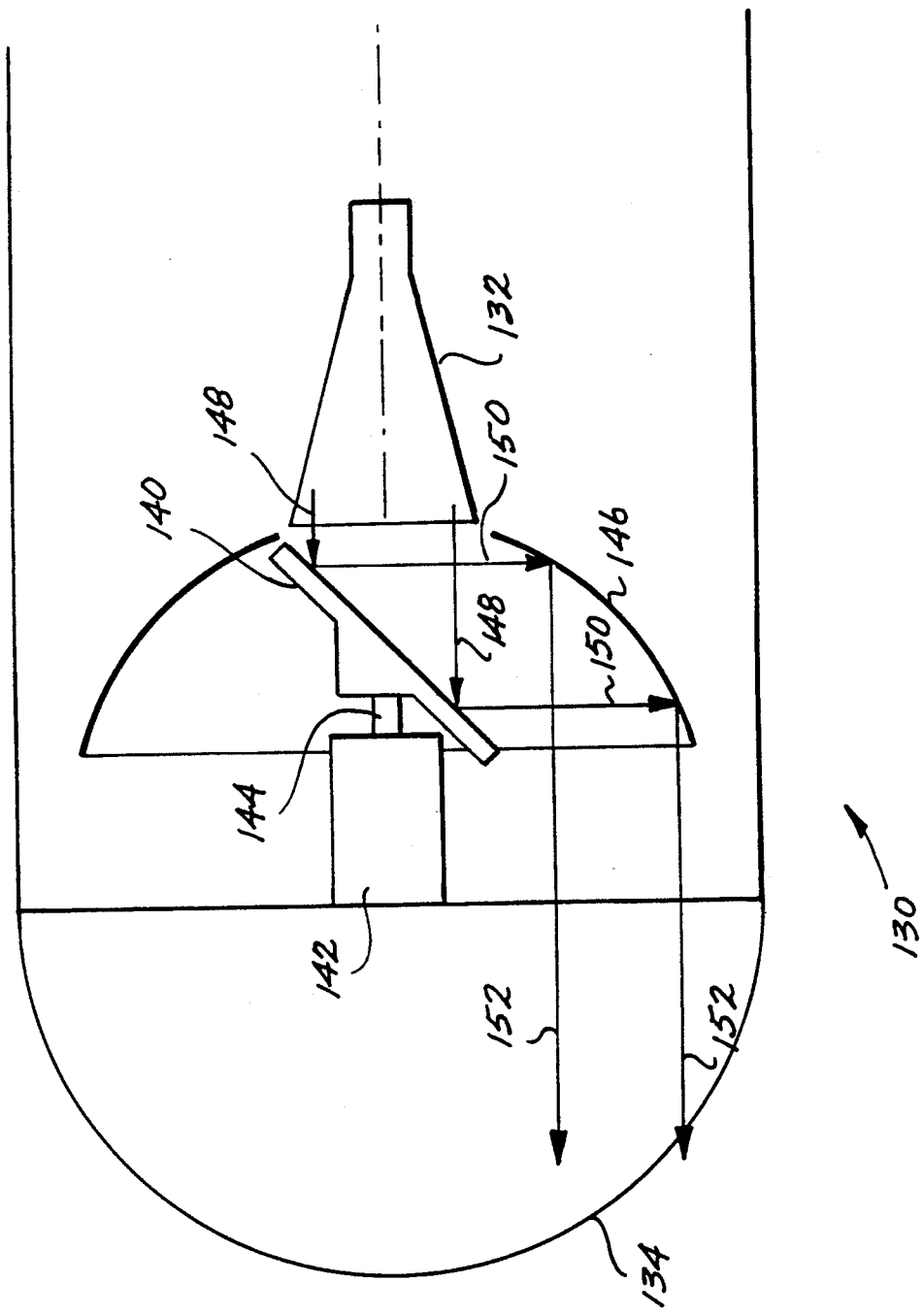

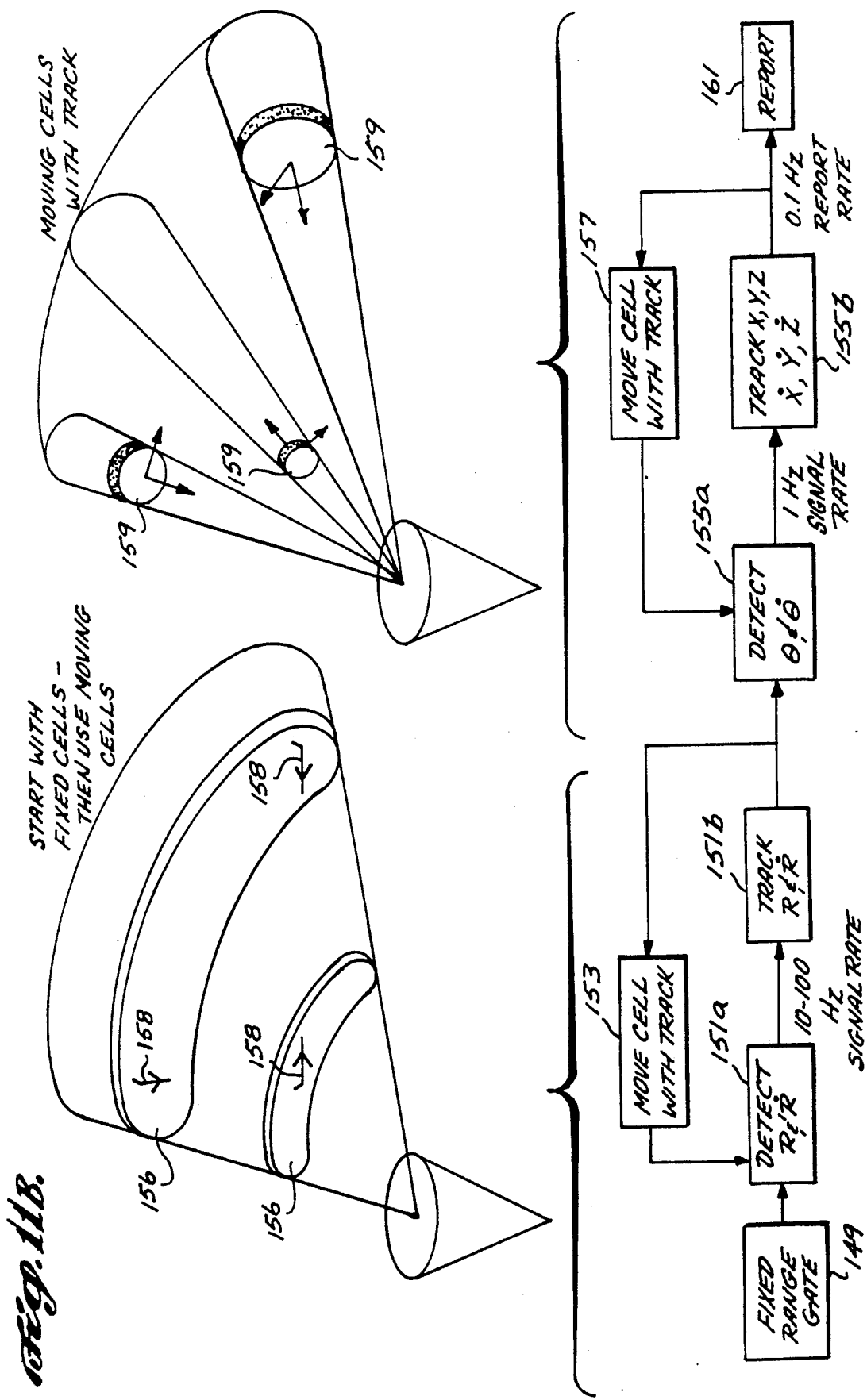

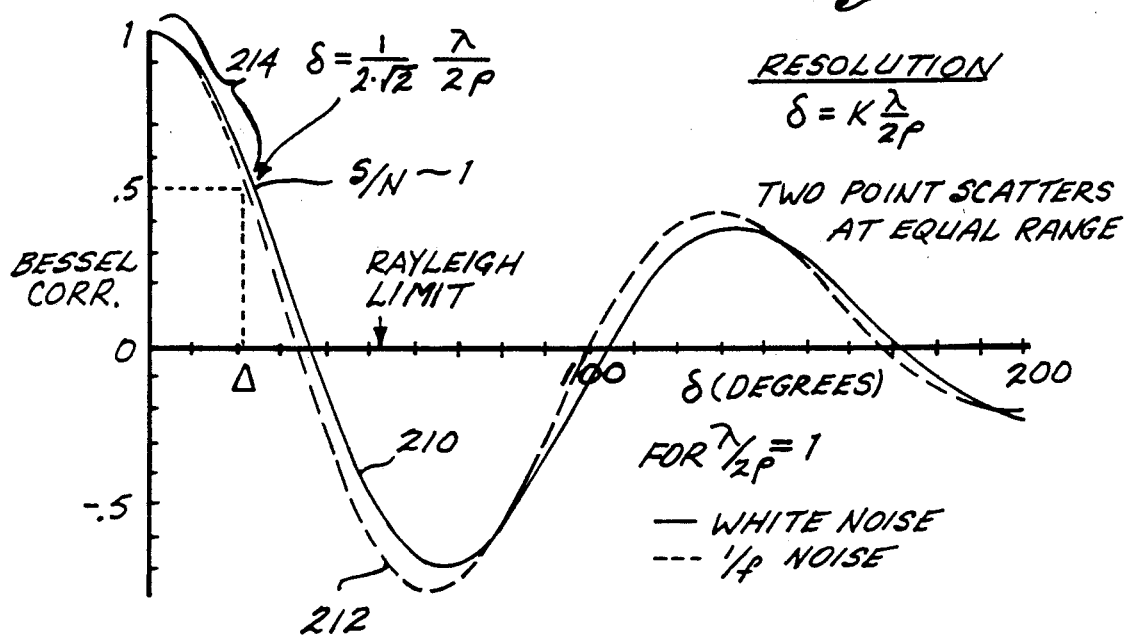
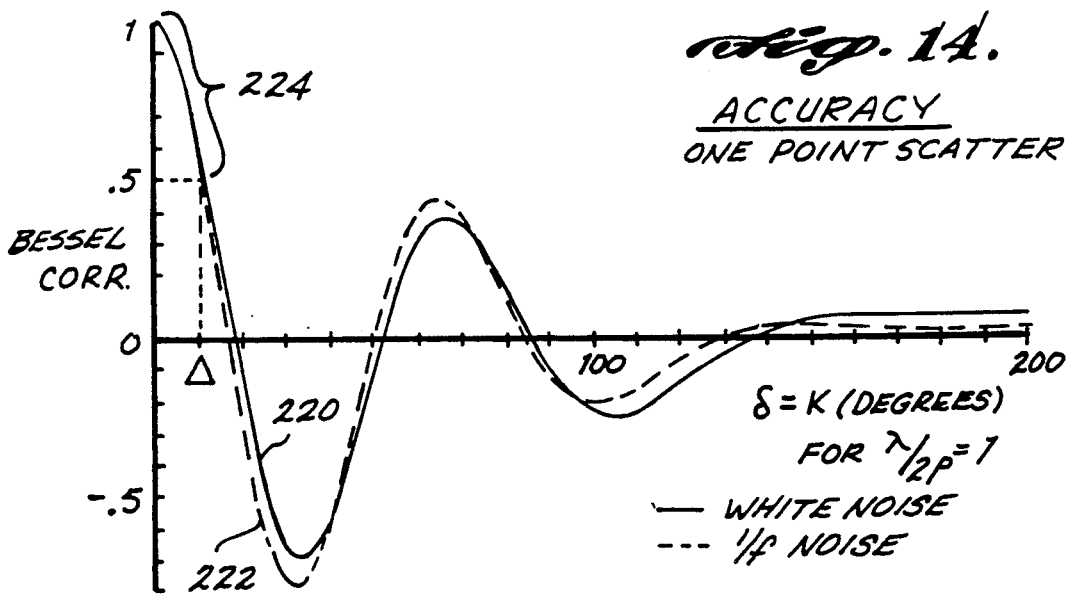

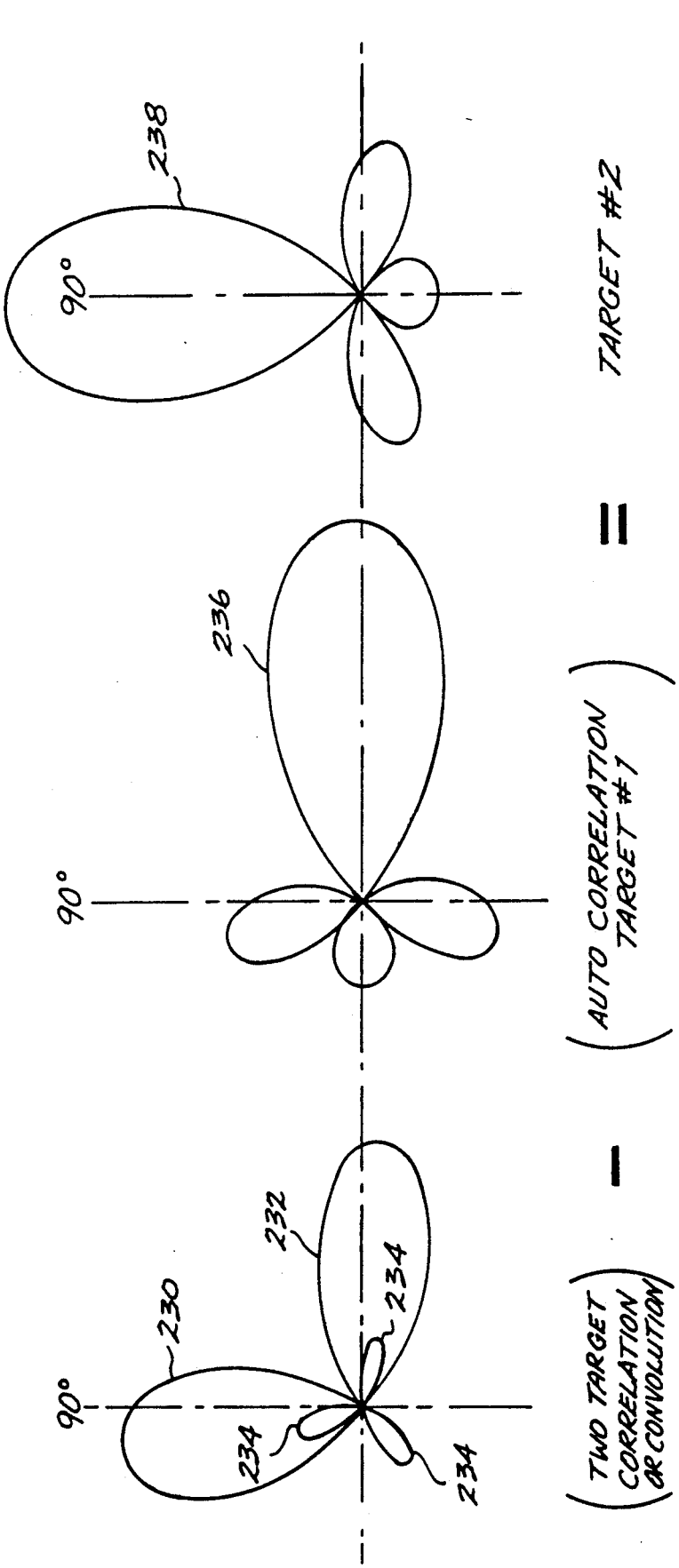

BESSEL BEAM RADAR SYSTEM USING SEQUENTIAL SPATIAL MODULATION

TECHNICAL FIELD

The present invention generally pertains to a radar system, and more specifically, to a radar system that spatially modulates a radar beam to resolve multiple, closely spaced targets.

BACKGROUND OF THE INVENTION

Conventional ground-based radars are generally incapable of resolving multiple targets that are spatially separated by less than the beam width of the radar signal at a given target range, because the radar signal reflected from closely spaced targets appears as a single target reflection. First one, then another of the targets may produce the stronger return pulse, so that the weaker reflected signal is buried and the azimuth and range of the target appears to vary in a random manner. In contrast, airborne synthetic aperture radar (SAR) systems can resolve such multiple, closely spaced targets in azimuth and range as the antenna on the aircraft moves along a predefined vector. The SAR system processes the resulting radar Doppler signal to separately resolve the positions of each target. However, this technique cannot be implemented by ground-based radar systems that are generally fixed in position.

In U.S. Pat. No. 3,849,779, multiple targets are resolved within one radar beam width by detection and analysis of either a phase-modulated component or an amplitude-modulated component of the radar signal that is modulated at twice the scan rate of the radar. The phase-modulated component is preferably employed if a speed gate/Doppler frequency tracker in the radar system is engaged; otherwise, the amplitude-modulated component is used. This system appears to be limited to resolving only two closely spaced targets.

Another multiple target radar tracking system is disclosed in U.S. Pat. No. 3,323,128, which teaches that at least two sets of orthogonally crossed line array antennas can be used to improve the resolution of a radar system. One of the sets of antennas is rotatable through a known angle relative to the other. The multiple output signals developed by the antennas are input to a computer so that the phase relationship of the radar signals reflected from plural targets can be analyzed to correlate the target locations. Apparently, the number of targets that can be simultaneously identified is limited to the number of sets of antenna arrays.

In a paper entitled "Feasibility of a Synthetic Aperture Radar with Rotating Antennas (ROSAR)," delivered before the 19th European Microwave Conference in London, U.K., in September 1989, Helmut Klausing described a ROSAR (Rotor-SAR) airborne radar system having improved resolution. In the ROSAR system, radar antennas are mounted at the tips of helicopter rotor blades, which thus form a rotating turntable. The resulting radar signal is used to produce a synthetic aperture image. However, in the ROSAR system, the nature of the rotating turntable does not permit compensation for the beam on-target amplitude and polarization changes that occur with rotation of the blades. Consequently, the system is spatially coherent for only about 60 degrees of turntable (rotor blade) rotation. The ROSAR system can resolve multiple fixed targets in a single field of view, but not moving targets. In addition, the ROSAR system does not have scan-to-scan coherence, i.e., the polarization, amplitude, and phase of each target are not maintained over successive rotations of the rotor blades. As a result, the effective resolution of the radar system is reduced.

In consideration of the resolution limitations of conventional radar systems, including the prior art radar systems discussed above, it is an object of the present invention to continuously coherently resolve a plurality of targets spaced apart by less than a radar signal beam width. It is a further object to resolve more than two such targets, with respect to range and azimuth, with a radar signal transmitted from either a generally fixed or moving position. These and other objects and advantages of the present invention will be apparent from the attached drawings and the Description of the Preferred Embodiments that follow.

SUMMARY OF THE INVENTION

In accordance with the present invention, a radar system capable of resolving multiple targets within a radar beam width includes transmitter means for producing a radar signal at a desired wavelength, and antenna means, connected to the transmitter means, for radiating the radar signal as a radar beam along a Poynting vector and receiving reflected signals from the targets. Modulation means are provided for periodically moving a point from which the antenna means transmit the radar beam by a fractional wavelength of the radar signal in respect to two orthogonal axes. While thus spatially modulating the radar beam, the modulation means maintain a constant spatial polarization for the radar signal. Also included is a receiver having processor means that are connected to process the reflected signals returning to the antenna means. The processor means develop a phase history for the reflected signals, and from the phase history, derive a function that uniquely determines an azimuth for each target in respect to the antenna means.

The antenna means include a pair of accelerometers that are mounted to monitor acceleration of the antenna means along the two orthogonal axes and to produce signals used by the processor means for correlating antenna position with the phase of the reflected signals to develop a phase history. In one form of the invention, the modulation means are operative to move the antenna means in a substantially circular orbit. The circular orbit can be substantially coplanar with the Poynting vector or substantially transverse thereto (or can be oriented between these two extremes). The function derived by the processor means from the phase history is a Bessel function.

The processor means are also operative to produce a Fourier transform of the phase history of the reflected signals to generate spatial frequency domain data and are operative to develop the Bessel function from the spatial frequency domain data. From the Bessel function, the processor means determine the azimuth and range for each of the multiple targets about the antenna means.

BRIEF DESCRIPTION OF THE DRAWINGS

FIGS. 5-7 are phase history plots for composite reflected signals for two targets on a rotating turntable for different target sizes, relative target angles, and target radii on the turntable, respectively;

FIG. 10 is a second embodiment of a radar antenna for spatially modulating a radar signal;

FIG. 11 is a third embodiment showing a radar antenna for spatially modulating a radar signal;

FIG. 11B is a block diagram schematically illustrating a signal processing strategy for tracking moving targets with a spatially modulated Bessel beam radar signal;

FIG. 13 is a graph illustrating the resolution with which two closely spaced targets can be resolved in degrees versus a Bessel correlation value for the spatially modulated Bessel beam radar system;

FIG. 14 is a graph illustrating the accuracy of the present invention in resolving an azimuth for a single target in degrees, as a function of a Bessel correlation value; and FIG. 15 graphically illustrates the correction of a convolution function for autocorrelation in determining the azimuth of two targets.

DESCRIPTION OF THE PREFERRED EMBODIMENTS

To facilitate understanding of how spatial modulation of a radar signal produces a complex phase history, it is perhaps easier to initially consider the spatial modulation of signals reflected from targets that are moving in a circle with respect to a radar signal transmitted from a fixed point. The spatial modulation of the reflected radar signal due to periodic motion of a target moving in a circular orbit produces a phase history which is consistent with the result that is obtained for a fixed target reflecting back a transmitted spatially modulated radar signal, as provided by the present invention.

Figure 1:
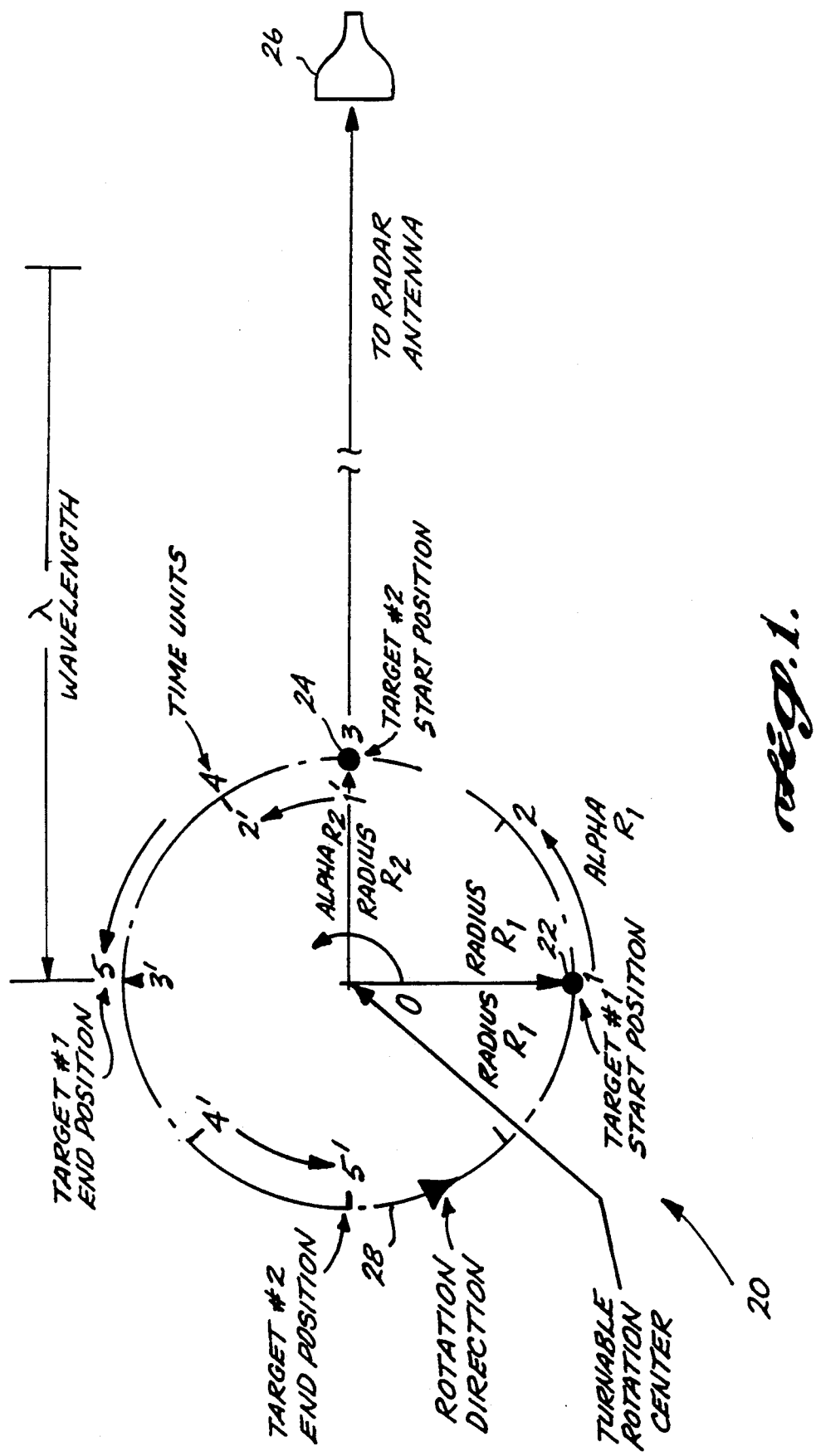
FIG. 1 schematically illustrates a rotating turntable on which are mounted two targets that reflect a radar signal from five different locations as the turntable rotates through 180 degrees.

As shown in FIG. 1, a rotating turntable 20 has a first target 22 and a second target 24 respectively mounted at equal radii $R_1$ and $R_2$, about a rotation center of the turntable. In this rotating target spatial modulation model, a fixed, monostatic, fully coherent, continuous wave (CW) radar system 26 produces a radar signal having a beam width, both horizontal and vertical, that is much larger than the effective diameter ($2R_1$ or $2R_2$) of rotating turntable 20. Turntable 20 rotates at a constant rate in the direction indicated by an arrow 28.

First and second targets 22 and 24 each comprise a metal sphere that reflects the radar signal transmitted from radar system 26.

As first target 22 moves through 180 degrees from its initial position at 1 through successive positions 2, 3, 4, and 5, it spatially modulates the reflected radar signal. Similarly, as second target 24 moves through 180 degrees of rotation, from its initial position at 1' through successive positions at 2', 3', 4', and 5', it also spatially modulates the reflected radar signal. With respect to radar system 26, first target 22 is initially inbound as it moves between positions 1 and 3, and is outbound during its motion between positions 3 and 5. In contrast, second target 24 is outbound between positions 1' and 5', through the entire 180 degrees of rotation of rotating turntable 20.

Figure 2:
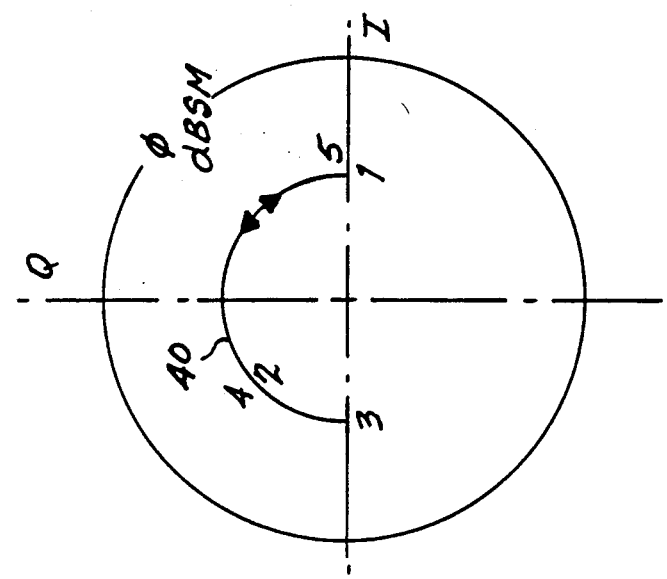
FIG. 2 is a phase history plot developed from the radar signal reflected from target one on the rotating turntable of FIG. 1 (target two not present)

Turning now to FIG. 2, a phase history 40 for first target 22 (with second target 24 removed from the turntable) is plotted for the 180-degree motion of rotating turntable 20 as the first target moves between position 1 and position 5. In this Figure and in each of FIGS. 3-7, the phase history of the spatially modulated reflected signal is plotted in respect to both its imaginary component on an axis Q and its real component on an axis I, in respect to a reference signal level of 0 dBSM. Certain assumptions are made in deriving these plots, as follows. The size of first target 22 is such that the reflected radar signal strength is 0.5, for a signal normalized to 1.0 at 0 dBSM. In addition, the radius of rotation (orbit radius) for first target 22 is equal to 0.25 times the wavelength $\lambda$ of the radar signal emitted by radar system 26.

Figure 3:
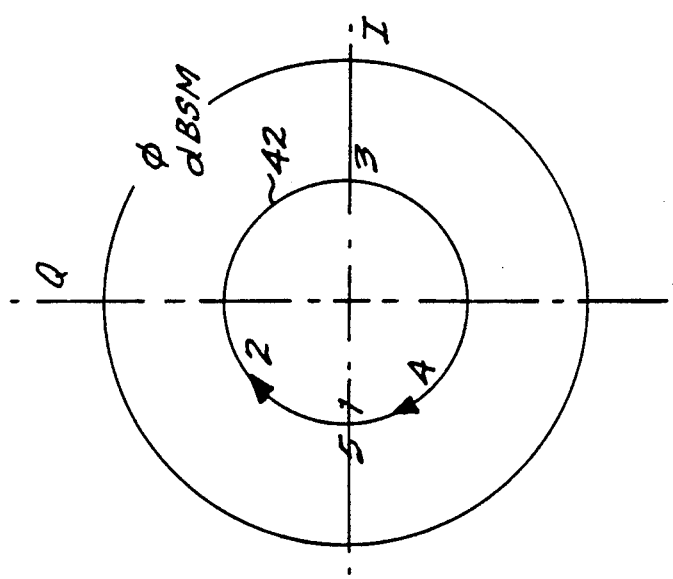
FIG. 3 is a phase history plot of the reflected signal developed by target two on the rotating turntable of FIG. 1 (target one not present)

Similarly, in FIG. 3, a phase history 42 is plotted for second target 24 (with first target 22 removed from rotating turntable 20). Second target 24 starts out at position 1', which is positioned around the central axis of the turntable at an angle $\alpha=90$ degrees relative to first target 22. The size of second target 24 is again sufficient to produce an amplitude of 0.5 in respect to 0 dBSM, and $R_2$, the radius of rotation (orbit radius) of second target 24, is also equal to 0.25 $\lambda$.

Figure 4:
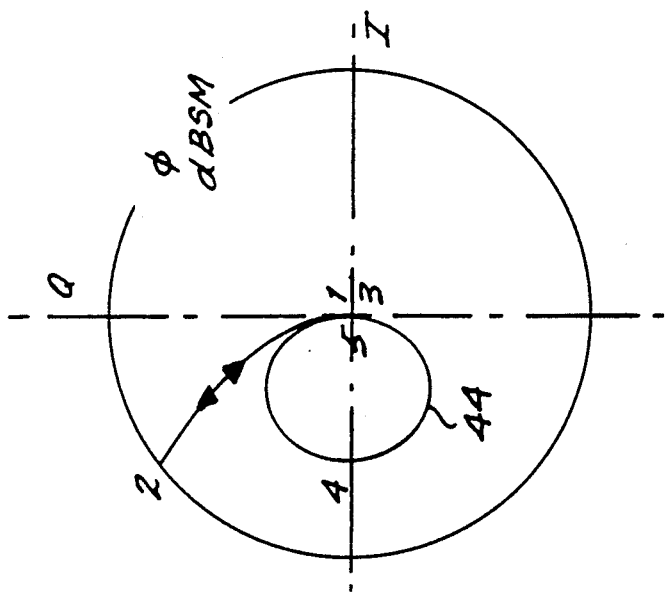
FIG. 4 is a phase history plot for the composite reflected signal from both targets one and two when mounted on the rotating turntable of FIG. 1.

In FIG. 4, a phase history 44 is plotted that represents the composite vector sum of phase histories 40 and 42 (for the composite spatially modulated radar signal reflected from both first and second targets 22 and 24 as they rotate through 180 degrees, as shown in FIG. 1). To simplify the plot of phase history 44 shown in FIG. 4, only the relative positions 1-5 of first target 22 are indicated. It will be apparent that phase history 44 is not intuitively obvious from inspection of phase histories 40 and 42.

In FIGS. 5-7, the effects of changing specific parameters for the targets used to produce a composite phase history are illustrated. In FIG. 5, to produce a phase history 46, first target 22 is made larger and second target 24 is made smaller so that the amplitude of the reflected radar signal from the first target is equal to 0.6, whereas the amplitude of the radar signal reflected from second target 24 is equal to 0.4, in respect to 0 dBSM. In FIG. 6, second target 24 is mounted at an angle $\alpha=60$ degrees relative to the first target, instead of at an angle $\alpha=90$ degrees, as was used in producing phase history 44. A resulting phase history 48 is substantially different than phase history 44, which is shown in FIG. 4. In FIG. 7, radius $R_2$ of second target 24 is changed from 0.25 $\lambda$ to 0.2 $\lambda$, producing a phase history 50 that is also different than the other phase histories previously discussed. Accordingly, based upon a comparison of FIGS. 4-7, it should be apparent that the composite phase history for two targets mounted on a rotating turntable changes in respect to the angular positions of the two targets, their relative size (or strength of the radar signals reflected by them), and their relative radii of rotation.

The phase histories shown in FIGS. 4-7 illustrate the effects of spatial modulation of a conventional radar signal by two moving targets mounted on rotating turntable 20 rather than a spatially modulated radar signal transmitted by a radar system. However, the phase histories for orbiting targets that spatially modulate a conventional radar signal can easily be mapped into a radar system wherein the transmitted radar signal is instead spatially modulated. Accordingly, a unique composite phase history for closely spaced targets that reflect back a transmitted spatially modulated radar signal can be processed to determine a specific azimuth and range for each of the targets.

In order to generate a Bessel function in the output of a radar, the radar antenna phase center must spatially describe a circle. Furthermore, the amplitude and spatial polarization for the signal reflected from a target must not change over an integration interval. A spatially modulated Bessel beam radar signal can be generated and received at discrete points about a circle, by an annulus phased array, or from separate transmit and receive antennas arranged in a phase circle. The Poynting vector (antenna beam direction) of the Bessel beam can be either parallel to the axis of the phase circle (transverse mode) or in the plane of the circle. The Poynting vector direction must not change during the integration interval or the beam amplitude and polarization function will degrade the target correlation process.

Figure 8:
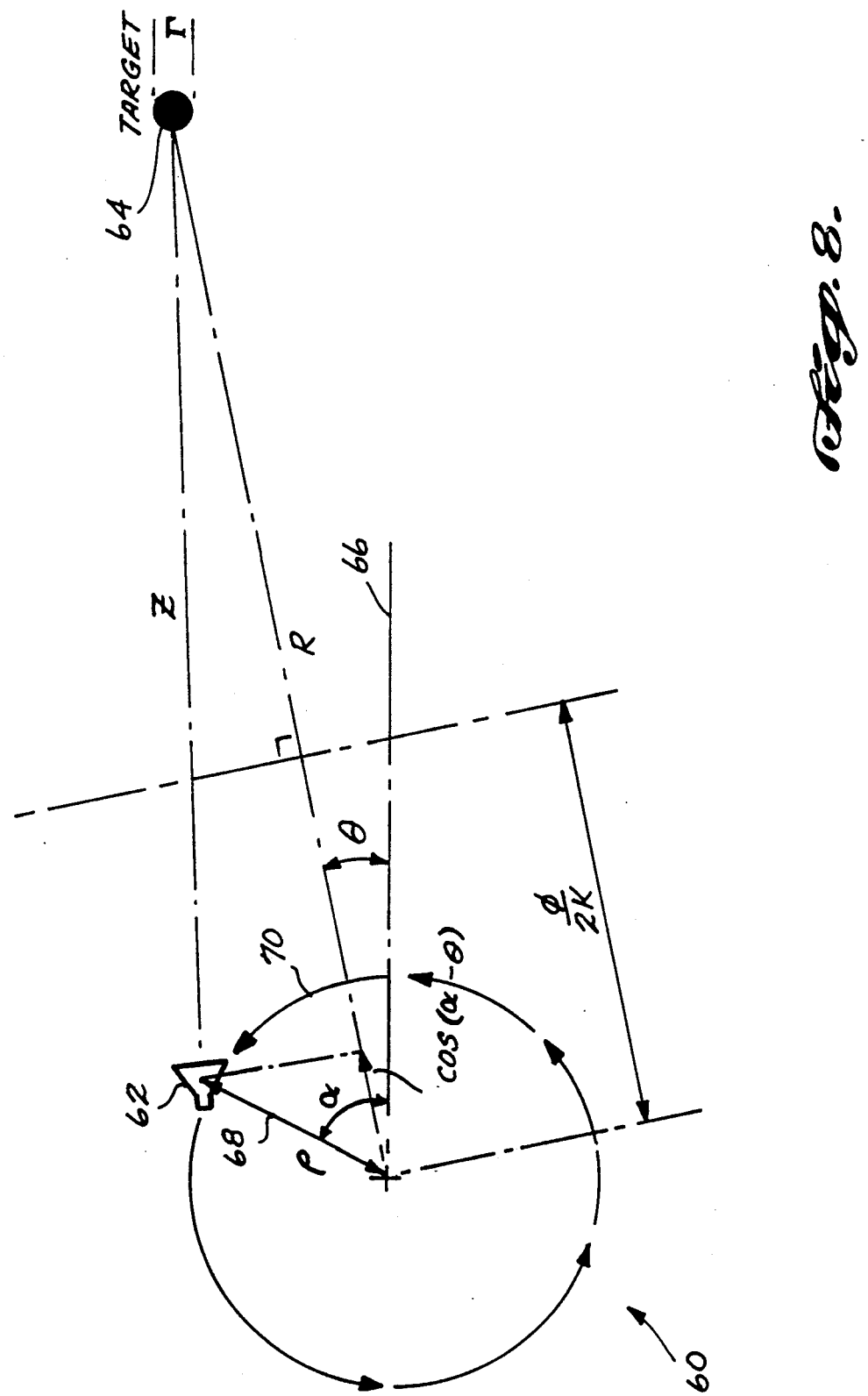
FIG. 8 is a schematic representation of a radar antenna that orbits around a circle to spatially modulate a radar signal directed to and reflected from a target, in accordance with the present invention.

In FIG. 8, a spatially modulated Bessel beam radar system 60 is graphically illustrated in which a radar antenna 62 produces a spatially modulated Bessel beam radar signal that is directed along a Poynting vector toward a target 64. To simplify the mathematical explanation for the improved resolution of the spatially modulated Bessel beam radar system, target 64 is positioned in alignment with the plane of rotation of antenna 62 at an azimuthal angle $\theta$ in respect to a baseline 66. Target 64 has a cross section equal to $\Gamma$ and lies at a range (the distance between target 64 and the orbital center of antenna 62) defined by R. The distance between antenna 62 and the target is equal to z. The angular position of radar antenna 62 in respect to baseline 66 is defined by an angle $\alpha$ as the radar antenna orbits about a center at a radius $\rho$. Using basic trigonometric relationships, a value for R can be determined based upon the values of z, $\rho$, and $\alpha$.

Radar antenna 62 transmits a radar signal toward target 64 and receives the reflected signal back from the target. At a given instant in time, for a non-spatially modulated signal, the radar signal reflected from target 64 and received at radar antenna 62 has the following relationship:

$$E(K, \sigma, z) = \Gamma \frac{e^{-j2kz}}{z} \quad (1)$$

In the above Equation 1, j represents the square root of $-1$, indicating that the reflected radar signal has both imaginary and real components. Equation 1 assumes that radar antenna 62 is not orbiting, but is fixed. However, a spatially modulated Bessel beam radar signal is produced by radar antenna 62 if it orbits around its orbital center at radius $\rho$, while maintaining a constant spatial polarization.

Assuming that the range R is much greater than the antennal orbital radius $\rho$, the distance z between antenna 62 and target 64 is approximately defined by:

$$z \approx R - \rho \cos(\alpha - \theta) \quad (2)$$

A general expression for the spatially modulated signal transmitted from radar antenna 62 (as it orbits), which is reflected from target 64 is:

$$E(K, \Gamma, \rho, \alpha, R) = \frac{\Gamma}{R} e^{-j2K(R - \rho\cos(\alpha-\theta)-\phi/2K)} \quad (3)$$

In Equation 3, a phase constant, $\phi/2K$, references the spatially modulated Bessel beam radar signal reflected from target 64 in respect to the internal phase offset of the radar system. The phase offset in radar signals transmitted and received from antenna 62 is affected, for example, by the length of a lead line (not shown) between antenna 62 and a transmitter and receiver (neither shown). This phase offset is also indicated in FIG. 8 by the term $\phi/2K$. In each occurrence, K is the wave number ($2\pi/\lambda$ radians/wavelength) of the transmitted signal.

By regrouping the terms of Equation 3 and substituting the terms $\beta = 2K\rho$ and $\psi = \alpha - \theta + \pi/2$, the following simplified equation is obtained:

$$E(K, \beta, \psi, R) = \frac{\Gamma}{R} e^{-j2KR} e^{j\phi} e^{j\beta \sin\psi} \quad (4)$$

In Equation 4, $\psi$ corresponds to the phase of the reflected spatially modulated Bessel beam radar signal, which changes with both angle $\alpha$ (a known variable) and azimuth angle $\theta$ (an unknown variable). As radar antenna 62 orbits about its orbital center, the cross section $\Gamma$ of the target can be determined at any point around the orbit, but the azimuth angle $\theta$ requires integration of Equation 4 over either the full orbit of radar antenna 62 or some defined increment thereof. Integration of Equation 4 over the full orbit of radar antenna 62 corresponds to determining the spatial spectrum of the received radar signal output from the radar antenna due to its reflection from target 64.

To simplify Equation 4 and the job of solving for the unknown quantities, it is helpful to consider the Bessel function identity:

$$e^{j\beta\sin\psi} = J_0(\beta) + \sum_{N=1}^{\infty} J_N(\beta) e^{jN\psi} + \sum_{N=1}^{\infty} (-1)^N J_N(\beta) e^{-jN\psi} \quad (5)$$

Equation 5 is an identity for a Bessel function ($J_N(\beta)$), which is bounded to include only positive values for integers N. The second term on the right side of Equation 5 (the first summation) corresponds to the upper side band of the Bessel function, and the third term in Equation 5 (the second summation) corresponds to a lower side band of the function. Using the accepted compact form for such a function:

$$J_{-N}(\beta) = (-1)^N J_N(\beta) \quad (6)$$

the identity of Equation 5 becomes:

$$e^{j\beta \sin \psi} = \sum_{N=-\infty}^{\infty} J_N(\beta) e^{jN\psi} \qquad (7)$$

Substituting for the term on the left side of Equation 7 in Equation 4, the spatially modulated radar signal reflected from target 64 (and received at antenna 62) can be written:

$$E(K, \beta, \psi, R) = \frac{\Gamma}{R} e^{-j2KR_0 e^{j\phi}} \sum_{N=-\infty}^{\infty} J_N(\beta) e^{jN\psi} \qquad (8)$$

Those of ordinary skill in the art will recognize from Equation 8 that the signal received back at antenna 62 has a spectral distribution corresponding to a wide bandwidth phase modulation. As the bandwidth of the transmitted radar signal becomes wider, the resolution with which the azimuth and range of closely spaced targets can be resolved increases. Thus, by spatially modulating the radar signal transmitted from radar antenna 62 and reflected from multiple, closely spaced targets, instead of only one target 64, the resolution with which azimuth $\theta$ and range R can be determined in respect to the multiple targets improves. Furthermore, owing to the identity:

$$\sum_{N=-\infty}^{\infty} J_N^2(\beta) = 1 \qquad (9)$$

the average power for the signal (transmitted and) received by radar antenna 62 is proportional to the sum of the squares of the individual components for the Bessel function and is constant with angle $\alpha$, i.e., constant about the complete orbit of the radar antenna. Therefore, the cross section of the target(s) can be determined without requiring integration around a complete orbit of the antenna.

Figure 9:
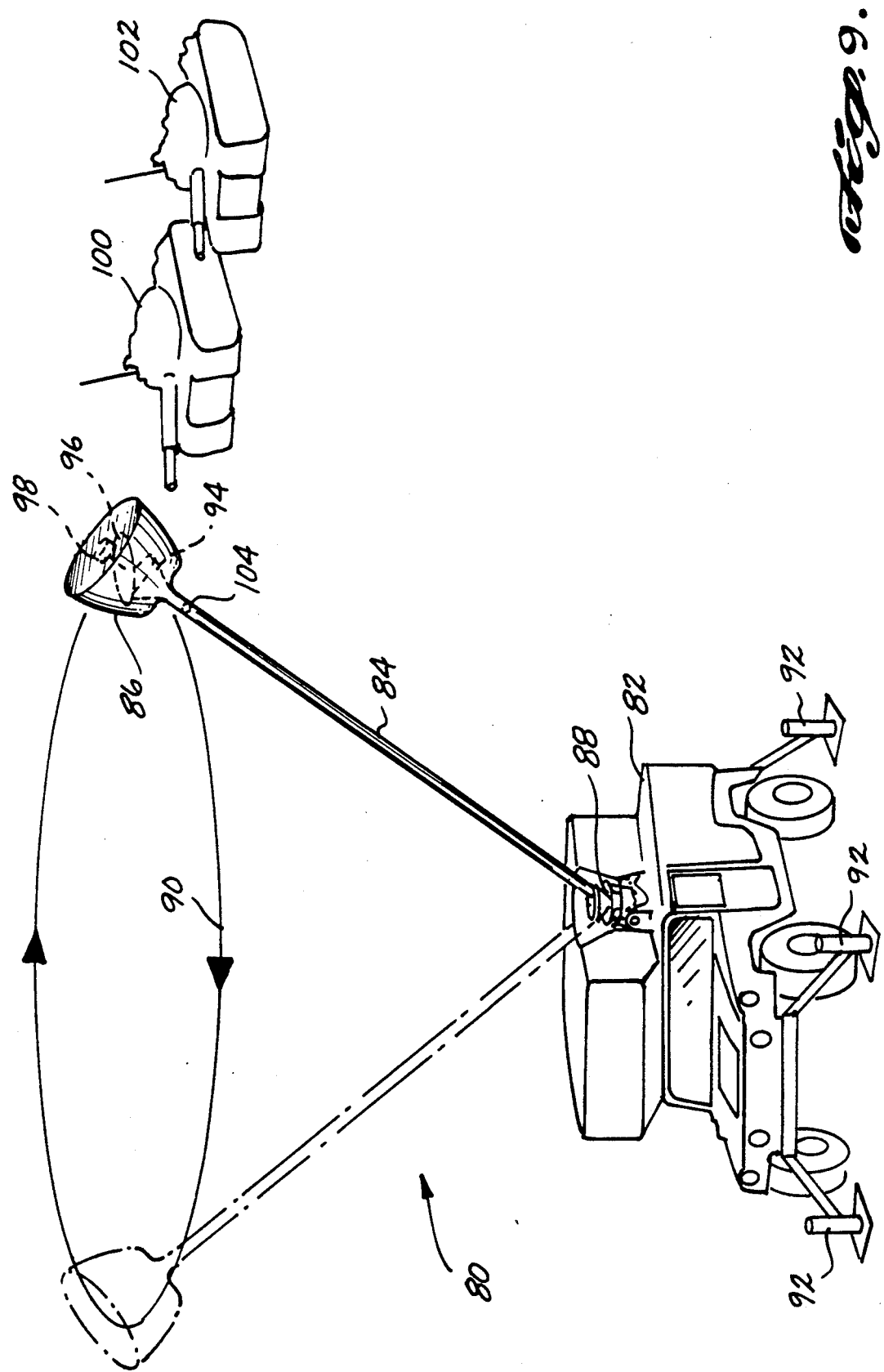
FIG. 9 is an isometric view illustrating a first embodiment of a radar antenna for spatially modulating a radar signal to resolve two closely spaced targets.

A Bessel beam radar system providing spatial modulation of the radar signal can thus be achieved by physically moving a radar antenna in an orbital path while it transmits a radar signal and receives reflections back from one or more targets. In FIG. 9, a first embodiment of such a spatially modulated Bessel beam radar system is shown generally at reference numeral 80. Spatially modulated Bessel beam radar system 80 is disposed on a vehicle 82, enabling the spatially modulated Bessel beam radar system to be moved about in the field, for use at a desired location. A mast 84 extends upwardly from vehicle 82 and at one end supports a radar dome 86. The lower end of mast 84 is connected to vehicle 82 at a pivotal mount 88, about which mast 84 is driven in a closed, circular orbit 90 by electrical or hydraulic motors (not shown) disposed on the vehicle. Several stabilizer pads 92 support vehicle 82 in a stable position as mast 84 swings radar dome 86 around orbit 90.

Disposed within radar dome 86 and oriented along the longitudinal axis of mast 84 is an antenna horn 94. Immediately above antenna horn 94 is an angled reflector 96, which can be rotated to a desired orientation by a motor 98. As radar dome 86 follows orbit 90, reflector 96 is maintained in the desired orientation so that the radar signal emitted by antenna horn 94 is directed along a Poynting vector to generally scan for targets disposed in a specific search area. By varying the direction in which the radar signal emitted by antenna horn 94 is reflected in the radar dome, i.e., by rotating reflector 96, the Poynting vector, and thus, the search area of spatially modulated Bessel beam radar system 80 are controlled. The Poynting vector is generally aligned with the plane of orbit 90 and can be oriented toward any point around vehicle 82. Alternatively, the angle of reflector 96 in respect to the plane of orbit 90 can be varied so that the Poynting vector is at an angle lying between the plane of orbit 90 and a line transverse to that plane.

In FIG. 9, the Poynting vector of the radar signal emitted by spatially modulated Bessel beam radar system 80 is directed to scan the horizon in a specific direction. The azimuth angles of two relatively closely spaced targets 100 and 102 (separated by less than a beam width) in the direction of the Poynting vector can readily be resolved due to the spatial modulation of the transmitted Bessel beam radar signal. Conventional radars would typically be unable to resolve targets 100 and 102 as two separate targets if they are spaced less than one radar beam width apart.

To follow angle $\alpha$ of radar dome 86 as it traverses orbit 90, a pair of accelerometers 104 are mounted within mast 84 adjacent to radar dome 86 and are operative to determine the acceleration of the radar dome in respect to two orthogonal axes, preferably lying in the plane of its orbit. Using acceleration data produced by accelerometers 104, the angular position of the radar dome each time that a signal reflected from targets 100 and 102 is received by antenna horn 94 can be determined in respect to the two orthogonal axes. Thus, a value for $\alpha$ used in determining phase $\psi$ in Equations 4 and 8 is determined using the acceleration data.

While the Poynting vector for the signal emitted by spatially modulated Bessel beam radar system 80 in FIG. 9 is shown generally aligned with the plane of orbit 90 (although not constrained to lie therein), in FIG. 10, a spatially modulated Bessel beam radar system 110 is shown in which the Poynting vector is generally transverse to a plane defined by a plurality of points from which the radar signal is emitted. Spatially modulated Bessel beam radar system 110 also is transported on a vehicle 82 on which are mounted stabilizer pads 92, but it includes a non-pivoting mast 112. At the upper end of mast 112 are disposed a plurality of radially extending arms 114. On the outer ends of arms 114 is mounted a circular array of parabolic antennas 116a–116f. A CW radar signal or narrow band pulse is sequentially emitted from each of the parabolic antennas 116 in order around the circular array. Accordingly, a spatially modulated Bessel beam 118 is transmitted from the antennas that is capable of resolving multiple targets 120 and 122, which are separated by less than a beam width of the radar signal.

In FIG. 11, a third embodiment of a spatially modulated Bessel beam radar system that might be used on an airborne platform is shown generally at reference numeral 130. In this embodiment, an antenna horn 132 disposed in a radome 134 produces a radar signal that is reflected from a fast rotating angled reflector 140 to different points around a parabolic reflector 146, and thence along a Poynting vector that is generally transverse to a plane through the locus of points around the parabolic reflector from which the radar signal is reflected into free space. For example, from one side of antenna horn 132, a transmitted radar signal 148 strikes rotating reflector 140, travels along a path 150, and is reflected from parabolic reflector 146 along a path 152. On the opposite side of antenna horn 132, transmitted radar signal 148 is reflected from a different point on rotating reflector 140, travels along path 150, and is reflected from parabolic reflector 146 along another path 152. Accordingly, paths 152 generally define the direction of the Poynting vector for the radar signal at a given instant, and the Poynting vector is transverse to paths 150. Rotating reflector 140 is attached to a shaft 144 that is rotatably driven by a motor 142 and thus serves as a phase rotation table.

Figure 11A:
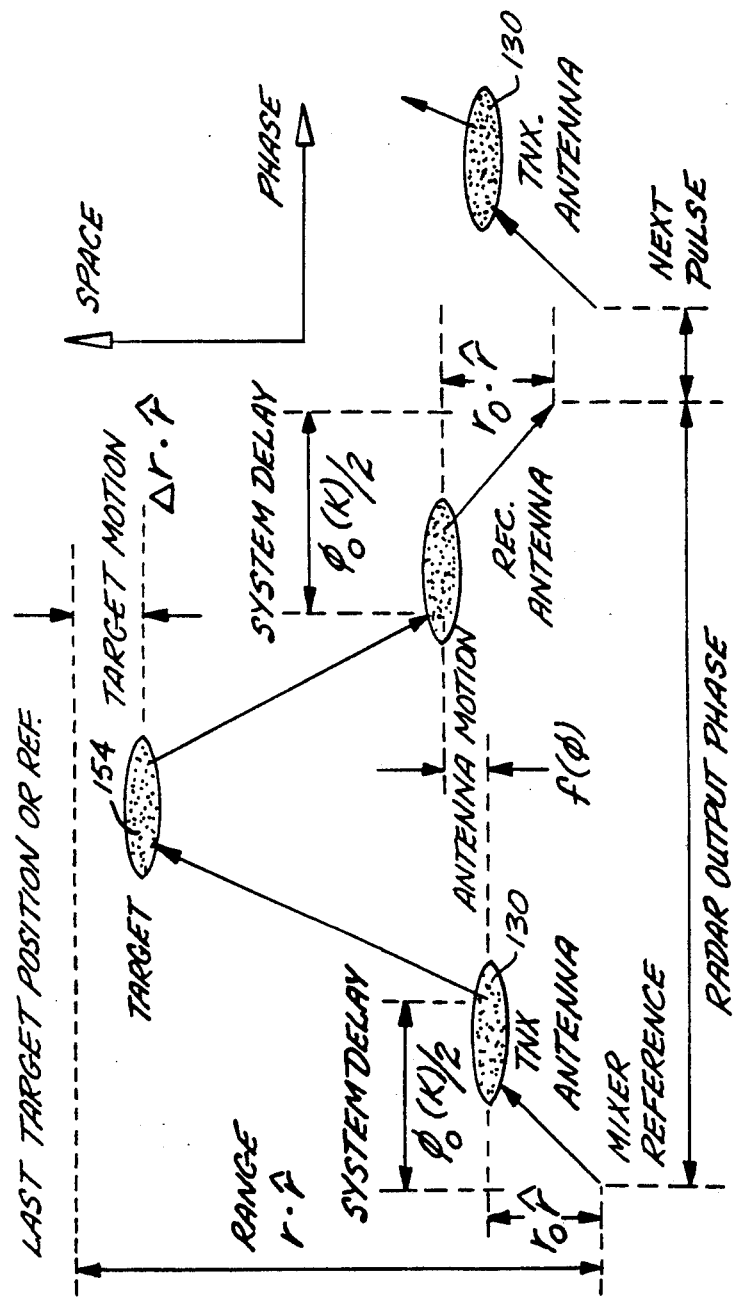
FIG. 11A is a monochromatic phase/space diagram for a moving antenna and target.

The radar signal produced by antenna horn 132 and reflected from the phase rotation table represented by rotating reflector 140 is a Bessel beam that has a Poynting vector aligned with paths 152 and a constant spatial polarization. If this Bessel beam is reflected from a moving target 154, as shown in FIG. 11A, the phase history of one reflected pulse received by Bessel beam radar system 130 can be analyzed with respect to a monochromatic phase/space diagram, which is shown in FIG. 11A. The assumptions for this analysis are: (a) target 154 is moving; (b) the pulse is monochromatic, i.e., it has a single frequency (or is narrow band); and (c) the receiver output is from one polarization channel, DC coupled, and base band coherent.

In FIG. 11A, a Bessel beam radar signal is transmitted toward target 154 as a series of sequential pulses over time. Between the transmission of one pulse and the receipt of the reflected pulse from a Bessel beam radar system 130 moves, contributing a radar output phase change $f(\phi_1)$. Motion of target 154 between successive reflected pulses is defined by $\Delta r \cdot r$. System delay in transmitting or receiving pulses (referenced to a mixer in the system) is represented by $r_o \cdot r$ and $\phi_o(K)/2$.

Using the monochromatic phase/space diagram of FIG. 11A to account for continuous phase/space effects, a phase output, $\Phi$, can be expressed as the sum of four terms:

$$\Phi = 2K(r \cdot r) - \Sigma 2K(\Delta r \cdot r) - \phi_o(K) - f(\phi_1) \qquad (10)$$

The wave number K and the distance to the target r dominate this frequency domain equation. The first and largest term is the spatial delay to the target (and back), which is a function of r·r, is usually removed by a range gate circuit in the radar system. The second term is the contribution of target motion ($\Delta r \cdot r$) and contains the bulk of signal processing load. These two terms are transformed into a Bessel function when the antenna phase has moved through a complete circle. The two-way antenna/system dispersion, $\phi_o(K)$, can be removed if the antenna/system are calibrated. Another error term $f(\phi_1)$ is the one pulse spatial delay of the antenna motion and also includes a contribution due to r, the rate of change of the range due to antenna motion. When the target is at a long range, r, motion of the antenna toward the target appears as an increased target velocity, r, toward the antenna. This term is small if the antenna is mechanically scanned, and much of the error can be removed even if the attitude angle of the target is unknown. In addition, this error term may also reflect the mechanical deviation of the system from following a perfect circle in producing the spatially modulated Bessel beam. The removal of the spatial delay error term is accomplished in the system by a time phase control circuit (not shown here) that is generally equivalent to the diffraction removal circuit or sensitivity time control in conventional base band radars. The time phase control circuit removes the error term by combining beam position and phase angle (obtained from a lookup table) with time of flight of the radar pulse from transmission to reception.

FIG. 11B shows the signal processing strategy used in the Bessel beam radar system for moving targets. The moving target presents a special problem for the Bessel beam radar system because the target can fly or otherwise move through a fixed range cell before the closed Bessel function is formed. The strategy for dealing with this problem is to use a fixed range cell for the initial detection and tracking of the range and rate of range change (velocity) for moving targets 158, begin tracking the targets with moving range cells 156, and then, after removing the range and velocity components of the return signal, forming a plurality of moving azimuth cells 159, wherein each target is tracked with its own Bessel beam.

A fixed range gate 149 responds to each reflected signal above a predetermined threshold to initially detect a target. In FIG. 11B, targets 158 have been detected at two different ranges. In a block 151a, the range R and range rate R are detected in about two milliseconds, or after about seven pulses of the Bessel beam have been transmitted. At a signal rate of from about 10 Hz to 100 Hz, the system accumulates sufficient data to start tracking changes in the range and range rate (velocity) for each range cell. If one of the two targets in the more distant range cell moves away from the other target sufficiently far to be resolved in a separate range cell, the system initially forms a fixed range cell for that target and then begins tracking the target in a third movable range cell.

It will be apparent that the range resolution of targets closer to the antenna is greater than for targets that are more distant in range (as indicated by the relative thickness of range cells 156 in the Figure). When the range of the targets changes, the system moves the range cells to track the targets, as shown in a block 153. More coherence time (accumulation of more data) enables the system to selectively vary the resolution of the range for each cell. After sufficient data is accumulated (i.e., after the phase rotation of the spatially modulated radar system has rotated through $\pi/\beta$ radians), the system can carry out the first Bessel integration using the range track history.

In a block 155a, after the radar signal spatial modulation has completed one rotation, the system uses the Bessel beam content of the spatially modulated beam to detect azimuth and azimuth rate for all of the targets. Azimuth and azimuth rate are detected by the system at a signal rate of about 1 Hz. In a block 155b, the system begins to track the spatial position of the targets in moving azimuth cells 159, using separate Bessel beams for each target. The Bessel beam associated with each target moves with the target track, as indicated in a block 157. In a block 161, the system generates a target report at a report rate of about 0.1 Hz. Processing the Bessel content of the Bessel beam is thus the key to both detecting and tracking the azimuth and range of closely spaced, multiple targets.

Figure 12:
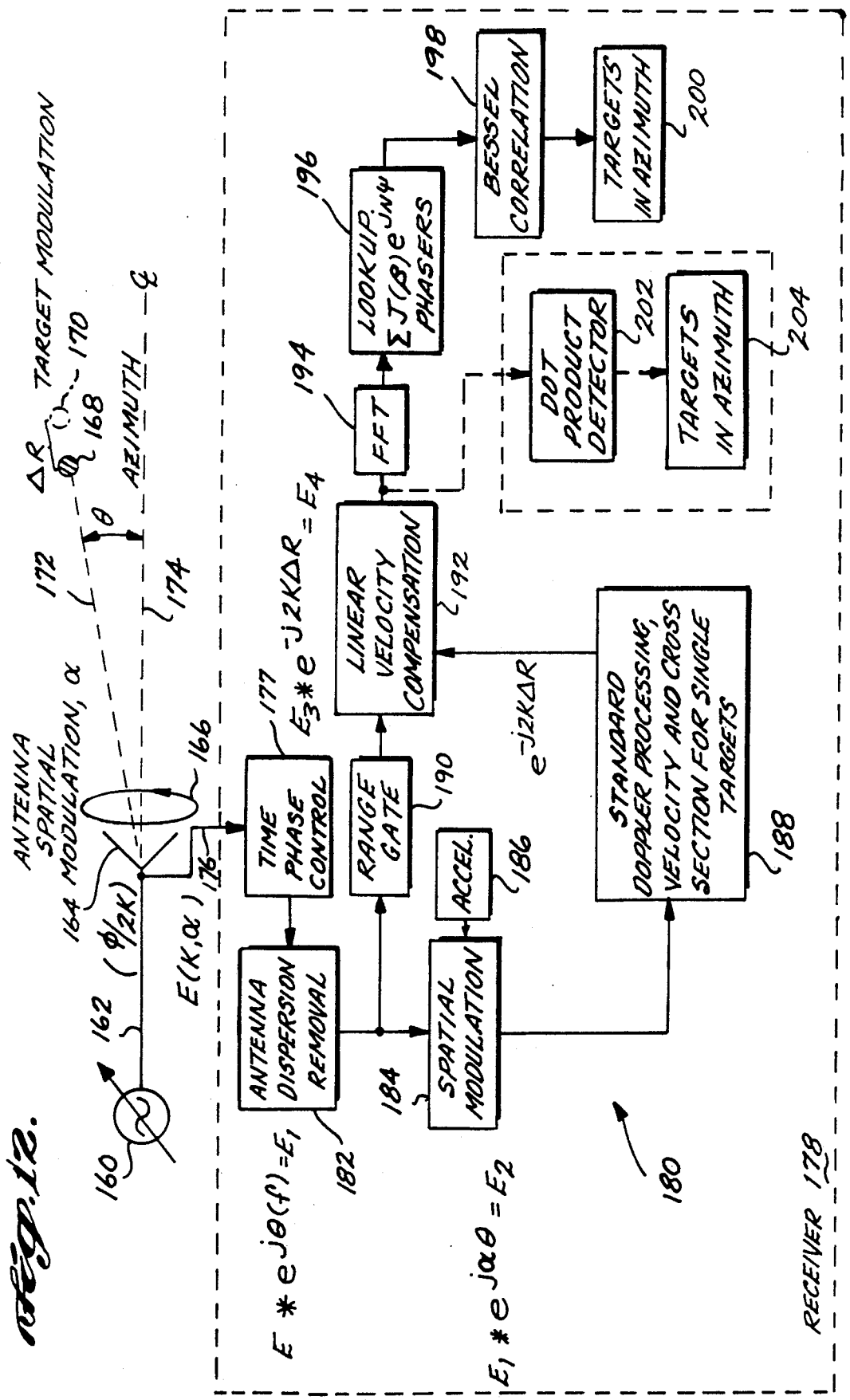
FIG. 12 is a block diagram illustrating a Bessel beam radar system and radar signal processor in accordance with the present invention.

Turning now to FIG. 12, a controller/processor 180 that is usable with each embodiment of the spatially modulated Bessel beam radar system described above is illustrated in a schematic block diagram. A radar transmitter 160 is connected through a lead 162 to an antenna 164 (which is intended to represent the radar antenna(s) described above in each of the spatially modulated Bessel beam radar systems 80, 110, and 130). Accordingly, antenna 164 emits a radar signal directed along a Poynting vector at some defined angle in respect to a reference line 174. The position of antenna 164 about its effective orbit 166 (or the position of the antenna in an annular array) at any given time is defined in respect to angle α.

Although only a single dot at target 168 is shown, this dot represents multiple, closely spaced targets. A composite radar signal reflected by the targets is received and is resolved by controller/processor 180 to determine the range and azimuth of each target, as explained below. The signal reflected back from targets 168 is received by antenna 164 and conveyed by a lead 176 to a time phase control block 177 in the receiver. In this block, spatial delay phase errors in the system are compensated, as discussed above in respect to FIG. 11A. The signal that is thus compensated for spatial delay phase errors is supplied to a functional block 182, wherein antenna dispersion is compensated.

To improve the resolution of target range as discussed in further detail below, transmitter 160 preferably transmits a series of pulses from antenna 164, each of which are at a different random frequency f that is selected from a band of frequencies lying between a predefined minimum and maximum. Alternatively, if conventional ranging techniques are used, a single frequency radar pulse may be transmitted. Associated with antenna 164 is a dispersion factor that is a function of the frequency f of the radar pulse transmitted. In block 182, antenna dispersion is removed from the reflected radar signal, E, by multiplying that signal by $e^{j\theta(f)}$ to obtain a corrected signal $E_1$. This signal is corrected for the spatial modulation applied to the transmitted radar signal in a block 184 by multiplying it by $e^{j\alpha\theta}$ to obtain a signal $E_2$. Since the spatial modulation correction depends upon α, the angular position at which the radar signal is transmitted and received by antenna 164, the signals produced by the pair of accelerometers 104 in FIG. 9—or by other means that determine the point at which the spatially modulated signal is transmitted and received by the antenna (such as an aircraft flight data system for an airborne platform)—are input to block 184 from a block 186.

The signal $E_2$ output from block 184 is input to a block 188, in which conventional radar signal processing is applied to determine a velocity and cross section for single targets. In addition, within block 188, clutter from the target background (i.e., reflections from non-target objects in the radar search environment that have a generally fixed reflected radar signal level) is removed. However, instead of using conventional ranging techniques in block 188, controller/processor 180 can use a "frequency agile" technique to enhance range resolution of targets 168. In the frequency agile method, radar pulses at different frequencies are transmitted to produce an effective synthetic bandwidth much greater than that which would result from using a single frequency. Other advantages of this technique will be apparent from the following discussion.

For certain applications, repeated transmission of radar pulses at a single frequency invites spot jamming by electronic countermeasures (ECM). Furthermore, it is known that use of a relatively wide bandwidth radar signal to improve resolution makes the task of ECM jamming easier, since less power and precision in selecting a jamming frequency within the bandwidth are required. Accordingly, although wide RF bandwidth provides greater resolution, it creates a greater probability that ECM jamming can disable the radar.

In conventional pulse Doppler radar systems, multiple pulses on a single frequency are used in order to separate DC clutter from a target reflection. To maintain target coherence in the frequency domain, each new frequency selection for a sequence of multiple pulses is set at the end of the target coherence for the previous frequency. Typically, after just a few such pulse sequences, ECM jammers can easily find the appropriate radar frequency required to jam the radar signal.

It is also possible to use compressed pulse radars to increase range resolution by phase coding the transmitted pulse with sub-pulses and then decoding the phase for each sub-range cell corresponding to the time that the sub-pulse reflected from the target arrives back at the radar antenna. This approach improves range resolution, but increases transmitter and receiver bandwidth; it also uses a single frequency, which is relatively easy to jam.

The spatially modulated Bessel beam radar system avoids many of the problems noted above by transmitting a succession of radar signals that are each of different frequency. When employing this frequency agile technique, target coherence is maintained in the frequency and spatial domains, yet additional range resolution is achieved by frequency domain processing (i.e., by range gate processing) of the reflected signals. The effective bandwidth of a series of different frequency pulses generated by transmitter 160 thus ranges from the lowest frequency pulse to the highest frequency pulse transmitted. Accordingly, the effective bandwidth of the radar signal using this frequency agile method is much wider than could be achieved using a single frequency pulse and the resolution with which the range of two targets can be resolved is greatly improved. Antenna dispersion removal in block 182 further increases the synthetic or effective bandwidth of antenna 164 by approximately a factor of four. In fact, even if a conventional technique rather than the frequency agile technique is used to determine target range, antenna dispersion removal in block 182 substantially improves range resolution.

If frequency agile ranging is employed, in block 188 a fast Fourier transform (FFT) processor is provided, which integrates the reflected pulses represented by signal $E_2$ at block 184. The number of targets that can be discriminated in range is determined by the number of pulses integrated by the FFT processor in block 188.

Block 188 produces an output signal corresponding to $e^{-2K\Delta R}$, which is input to a block 192 to provide velocity compensation. The range of targets 168 changes over a known time interval by an amount $\Delta R$ in respect to a previous range, enabling the velocity of the targets to be readily computed to determine a velocity component. Another input to block 192 is provided by a range gate 190 that operates on the signal $E_1$, which is output from block 182. Range gate 190 is not mandatory, but improves the signal-to-noise ratio by reducing clutter from non-targets. A signal $E_3$ is output from range gate 190 and is processed to compensate for the velocity of the target in respect to antenna 164. The velocity component is derived from block 188, and is multiplied times the signal $E_3$ to provide a velocity compensated signal $E_4$. The value of the velocity compensated signal $E_4$ thus corresponds to the value of E in Equation 8, which was developed above, and can be solved in terms of a closed form Bessel function to determine the azimuth of each of targets 168.

In a first preferred solution that resolves the azimuth of multiple targets 168, velocity compensated signal $E_4$ is input to a FFT processor in a block 194. The following technique reconstructs azimuthal data for each of targets 168 using the resulting spatial frequency domain. Since the spatially modulated radar signal reflected from targets 168 comprises uniform samples, a Fourier transform of the phase history represented by signal $E_4$ has a spatial frequency distribution. Furthermore, if the spatial modulation represented by orbit 166 in FIG. 12 is generally transverse with the Poynting vector along which the radar signal propagates from the radar antenna to the target, then the spatial frequency distribution is defined by a Bessel function of the third kind. However, the Poynting vector need not be transverse with the spatial modulation (i.e., with the effective orbit of the antenna); instead, the two may form an acute angle. As the spatial modulation of the radar signal produced by antenna 164 becomes coplanar to the Poynting vector, the spatial frequency distribution simplifies to a Bessel function of the first kind.

The FFT processor in block 194 samples the signal $E_4$ to develop a spatial frequency distribution, the "bins" or frequency increments of which define Bessel lines, thus determining a spatial frequency plane. A fundamental spatial harmonic bin number, equal to the FFT increment size per sample for 360 degrees spatial modulation of antenna 164 is then computed. If possible, the number of samples or increments of spatial modulation should be controlled so that the fundamental harmonic bin number is an integer number. All of the harmonic phasers in the spatial frequency plane, i.e., the FFT bins that are integer multiples of each other, are then determined, and all other bins are discarded.

Starting with the highest frequency harmonic having a value below a predetermined signal-to-noise ratio threshold, e.g., −23 dB, the upper limit of the spatial modulation provided by antenna 164 is defined in respect to orbit 166. Subsequently, in a block 196, a look-up table in which phasers for the effective radius of the spatial modulation (radius $\rho$ of orbit 166) are stored is used to look up predetermined Bessel coefficients for the Bessel function $\Sigma J(\beta)e^{jN\psi}$, each phaser corresponding to a predefined angle $\alpha$ at which the radar signal is transmitted to sample the target position.

In a block 198, Bessel phasers developed using the Bessel coefficients from the look-up table are correlated with the spatial harmonic phasers developed by the FFT processor in block 194. A correlation function for each of the spatial harmonics is integrated or added using a window that is based upon the magnitude of the spatial harmonic. A correlation value is determined as a function of angle $\alpha$ and azimuth $\theta$ and stored, thereby developing a spatial correlation plane for one closed loop (360°) of spatial modulation of the radar signal. This step is repeated for each angle $\alpha$ at which the radar signal samples targets 168, to develop a correlation value for each possible azimuth.

Finally, in a block 200, each target having an azimuth correlation value greater than a predetermined minimum, e.g., 0.5, is identified, and the corresponding azimuth for that target is indicated. For example, as shown in FIG. 12, targets 168 and 170 (the latter represented by a phantom target dot) would be identified at an azimuth angle $\theta$ and a range as determined in block 188. Since target 170 (at about the same azimuth, and spaced apart from targets 168 by a range $\Delta R$ that is less than twice the radius $\rho$ of orbit 166) changes the spatial harmonic phasers developed by the FFT processor, the incremental range $\Delta R$ between targets 168 and 170 is resolved and determined in the same fashion as the azimuth of targets 168 was determined.

As an alternative to the above-described signal processing technique, the velocity compensated value $E_4$ is input to a dot product detector, in a block 202. The dot product of two vectors equals the projection of one vector in the direction of the other. This property is useful in finding a vector hidden in a complex phase history, such as that represented by signal $E_4$. Since the complex phase history corresponds to the sum of vectors rather than their product, it should be intuitively apparent that the convolution of dot products between a single target phase history and the complex phase history for multiple targets can reveal the spatial origin, i.e., the azimuth, of each target. Accordingly, a convolution value $h(\alpha)$ is determined as follows:

$$h(\alpha) = \int_O^{2\pi N} f(\tau) \cdot g^*(\alpha - \tau) d\tau \qquad (11)$$

In Equation 11, the function $g^*$ is a mathematical conjugate of the function $(\alpha - \tau)$, wherein $\tau$ represents the time at which the radar signal was transmitted from antenna 164 at N spaced-apart points around its effective orbit 166, and $f(\tau)$ is the frequency of the radar signal at time $\tau$. The convolution value $h(\alpha)$ is normalized to a correlation value between 0 and 1.0 that determines the number of targets that produce the complex Doppler phase history and their azimuth.

For example, in FIG. 15, a convolution plot for two targets disposed respectively at an azimuth of 0 degrees and 90 degrees is shown on the left side of the Figure. The convolution plot includes two major lobes 230 and 232, and three sideband lobes 234. It is apparent that major lobes 230 and 232 are not exactly orthogonal, because the convolution plot is contaminated by the auto-correlation function for the target at 0 degrees azimuth. By subtracting the auto-correlation for the first target at 0 degrees as represented by a lobe 236 at the center of FIG. 15, a primary lobe 238 for the second target centered at 90 degrees azimuth results.

Referring back to FIG. 12, the convolution determined by dot product detector block 202 is input to a block 204, wherein it is used to resolve the azimuth for each target reflecting a radar signal back to radar antenna 164.

Of the two techniques disclosed above for processing the complex phase history signal, the first technique represents the preferred approach, because the number of Bessel lines, which corresponds to the radius of the antenna phase rotation orbit, establishes the minimum number of mathematical operations required to solve the correlation, i.e., the first technique requires less processor overhead, and is therefore preferred.

As shown in FIG. 13, the resolution, $\delta$, with which two closely spaced targets can be separately resolved, is illustrated graphically as a function of their Bessel correlation by a curve 210, wherein the resolution is related to white noise, and by a curve 212, wherein the resolution is related to 1/f noise. Bessel correlations in the range 0.5 through 1, represented by a portion 214 of curves 210 and 212, yield resolutions for the azimuth angle between the two targets from 0 degrees through approximately 22 degrees, for $\lambda/2\rho$ equal to 1. The lower limit of a usable Bessel correlation representing a possible target (0.5) occurs where the signal-to-noise ratio (S/N) is approximately equal to 1.

In FIG. 14, the accuracy with which the azimuth of a single target can be determined is illustrated in respect to white noise by a curve 220 and in respect to 1/f noise by a curve 222, as a function of the Bessel correlation value. A portion 224 of curves 220 and 222 for a Bessel correlation between 0.5 and 1 (the correlation identifying a probable target) defines an accuracy range from approximately 0 to 10 degrees, for $\lambda/2\rho$ equal to 1.

While the present invention has been disclosed in respect to several preferred embodiments and modifications thereto, those of ordinary skill in the art will appreciate that further modification may be made within the scope of the claims that follow. Accordingly, the scope of the invention is not limited to the specifics of the preferred embodiments, but instead should be interpreted entirely by reference to the claims.

The invention in which an exclusive property or privilege is claimed is defined as follows:

1. A radar system capable of resolving multiple targets within a radar beam width, comprising:
   (a) transmitter means for producing a radar signal at a desired wavelength;
   (b) antenna means, connected to the transmitter means, for radiating the radar signal as a radar beam along a Poynting vector, and for receiving a reflected signal from each target;
   (c) modulation means for periodically varying a position from which the antenna means radiates the radar signal by a fractional wavelength of the radar signal in respect to two orthogonal axes while maintaining a constant spatial polarization for the radar signal, thereby spatially modulating the radar beam; and
   (d) a receiver that includes processor means, connected to receive and process the reflected signals from the antenna means, for developing a phase history of the reflected signals, and further operative to derive from the phase history a function that uniquely determines an angular position of each target about the antenna means.

2. The radar system of claim 1, wherein the antenna means include a pair of accelerometers mounted to monitor acceleration along the two orthogonal axes, producing signals used by the processor means for correlating antenna position with the phase of the reflected signals to develop the phase history.

3. The radar system of claim 1, wherein the antenna means comprise a plurality of spaced-apart antennas arranged in a circular array, each antenna being connected to the transmitter means to transmit the radar beam from a different point around the circular array.

4. The radar system of claim 1, wherein the modulation means are operative to move the antenna means in a substantially closed orbit.

5. The radar system of claim 1, wherein the positions from which the antenna means radiate the radar signal are substantially coplanar with the Poynting vector.

6. The radar system of claim 1, wherein the positions from which the antenna means radiate the radar signal are substantially transverse to the Poynting vector.

7. The radar system of claim 6, wherein the function developed by the processor means is a Bessel function, which uniquely determines the angular spatial position of each target about the antenna means.

8. The radar system of claim 7, wherein the processor means are operative to produce a Fourier transform of the phase history of the reflected signals to generate spatial frequency domain data and operative to develop the Bessel function from the spatial frequency domain data.

9. The radar system of claim 1, wherein the processor means are further operative to determine a range for each target with a resolution less than twice an effective radius of the modulation means.

10. The radar system of claim 1, wherein the receiver includes antenna dispersion removal means for enhancing the resolution with which the range of each target is determined.

11. The radar system of claim 1, wherein the transmitter means transmits a plurality of pulses, each of the pulses having a different frequency within a band of frequencies, said range of frequencies comprising a synthetic bandwidth for the radar beam, said processor means being operative to process the reflected signals in the frequency domain to determine a range for each of the targets.

12. In a radar system having a radar transmitter and receiver for respectively producing a radar signal and receiving a reflected signal from a target, apparatus for improving the resolution with which the radar system resolves a plurality of closely spaced targets, comprising:
   (a) antenna means connected to the radar transmitter and receiver and operative to transmit a radar beam along a Poynting vector and to receive the reflected signal from the target;
   (b) modulation means, connected to the antenna means, for changing a position from which the antenna means transmits the radar beam with respect to two orthogonal axes while maintaining a constant spatial polarization for the radar signal, whereby changing the position from which the radar beam is transmitted from the antenna means spatially modulates the radar beam; and
   (c) processing means, connected to receive the reflected signal from the antenna means, for developing a phase history of the reflected signals to derive a Bessel function used in determining an azimuth for each target about the antenna means.

13. The apparatus of claim 12, wherein the modulation means periodically move the antenna means in a generally vertical, closed orbit.

14. The apparatus of claim 12, wherein the modulation means periodically move the antenna means in a generally horizontal, closed orbit.

15. The apparatus of claim 12, further comprising means for determining the position of the antenna means as it moves and producing a signal indicative of said position.

16. The apparatus of claim 15, wherein the processor means use the signal indicative of said position to develop the phase history and to perform a synthetic aperture integration having a closed form of the Bessel function.

17. The apparatus of claim 12, wherein the antenna means periodically move through a distance that is a fraction of the radar signal wavelength.

18. The apparatus of claim 12, wherein the antenna means comprise a plurality of antennas spaced apart in a circular array, said modulation means being operative to transmit the radar signal from the antennas at different positions around the array.

19. The apparatus of claim 12, wherein the transmitter generates a different frequency pulse within a range of frequencies for transmission from the antenna means to synthesize an increased effective bandwidth for the radar signal to improve the resolution with which a target range is determined by the processor means, and wherein the processor means are operative to produce a Fourier transform of the phase history of the reflected signals to generate spatial frequency domain data, and operative to develop the Bessel function from the spatial frequency domain data.

20. The apparatus of claim 19, wherein the processor means are further operative to compare the spatial frequency domain data to Bessel function phasers developed from a plurality of predetermined Bessel function coefficients to determine a spatial correlation plane relating correlation values to a target location.

21. The apparatus of claim 12, wherein the processor means include antenna dispersion removal means for improving the resolution with which a range from the antenna means to the target is determined.

22. A method for resolving multiple targets separated by less than a radar beam width, for use with a radar system having a radar transmitter, a radar receiver, and antenna means for directing a radar beam along a Poynting vector and receiving a reflected signal from the target, comprising the steps of:

spatially modulating the radar beam about a closed path by periodically changing the position from which the radar beam is transmitted while maintaining a constant spatial polarization for the radar beam; processing the reflected signal from the targets to develop phase history data for the reflected signal; and determining an azimuth for each target about the antenna means as a function of the phase history data.

23. The method of claim 22, further comprising the steps of transmitting a plurality of pulses from the antenna means, each pulse having a frequency within a predefined range of frequencies; and developing range data for the targets from frequency domain data determined by processing the reflected signal from the targets with a fast Fourier transform processor.

24. The method of claim 22, further comprising the step of removing an antenna dispersion from the reflected signals received by the antenna means, whereby a range for each of the targets from the antenna means is resolved with a selectively variable resolution.

25. The method of claim 22, wherein the step of determining the azimuth includes the step of continuously maintaining a target coherence over multiple periods of spatial modulation.

26. The method of claim 23, wherein the range data are used to generate a range gate signal, which is initially used to detect one or more moving targets in a fixed range cell, and in response, an accumulation of additional range data for each target, further comprising the step of providing a separate movable range cell for tracking the range of each target as it changes.

27. The method of claim 26, wherein the step of determining the azimuth comprises the steps of: producing a Fourier transform of the phase history data of the reflected signals to produce spatial frequency domain data; and developing a Bessel function from the spatial frequency domain data used to define the azimuth and an azimuth rate for each target.

* * * * *

UNITED STATES PATENT AND TRADEMARK OFFICE
CERTIFICATE OF CORRECTION

PATENT NO. : 5,093,649
DATED : March 3, 1992
INVENTOR(S) : Walter J. Johnson

It is certified that error appears in the above-identified patent and that said Letters Patent is hereby corrected as shown below:

| COLUMN | LINE | |
|---|---|---|
| 1 | 55 | "(Rotor-SAR)" should read --(ROtor-SAR)-- |
| 9 | 30 | "$\Delta r.r.$" should read --$\Delta r.\hat{r}$.-- |
| 9 | 32 | "$r_o \cdot r$" should read --$r_o \cdot \hat{r}$-- |
| 9 | 38 | $\Phi = 2K(r \cdot r) - \Sigma 2K(\Delta r \cdot r) - \phi_o(K) - f(\phi_1)$ should read --$\Phi = 2K(r \cdot \hat{r}) - \Sigma 2K(\Delta r \cdot \hat{r}) - \phi_o(K) - f(\phi_1)$-- |
| 9 | 43 | "$r \cdot r$" should read --$r \cdot \hat{r}$-- |
| 9 | 45 | "$(\Delta r \cdot r)$" should read --$(\Delta r \cdot \hat{r})$-- |
| 9 | 52 | "r," should read --$\dot{r}$,-- |
| 9 | 56 | "r," should read --$\dot{r}$,-- |
| 10 | 21 | "R" should read --$\dot{R}$-- (second occurrence) |
| 12 | 50 | "$e^{-2K\Delta R}$" should read --$e^{-j2K\Delta R}$-- |

Signed and Sealed this

Sixth Day of July, 1993

MICHAEL K. KIRK

*Attest:*

*Attesting Officer*          *Acting Commissioner of Patents and Trademarks*